US010525994B2

(12) United States Patent
Le Bastard

(10) Patent No.: US 10,525,994 B2
(45) Date of Patent: Jan. 7, 2020

(54) METHOD FOR EVALUATING THE VELOCITY OF A RAILWAY VEHICLE

(71) Applicant: Alstom Transport Technologies, Levallois-Perret (FR)

(72) Inventor: Jean Le Bastard, Versailles (FR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 1339 days.

(21) Appl. No.: 14/138,398

(22) Filed: Dec. 23, 2013

(65) Prior Publication Data

US 2014/0188427 A1     Jul. 3, 2014

(30) Foreign Application Priority Data

Dec. 27, 2012    (FR) ...................................... 12 62838

(51) Int. Cl.
     *B61L 25/02*         (2006.01)
(52) U.S. Cl.
     CPC .................................. *B61L 25/021* (2013.01)
(58) Field of Classification Search
     CPC ....... G01C 21/165; G01C 19/42; B60T 8/165; B60T 8/74; B60T 8/17616; B61F 5/22; B60W 40/107; B61C 13/00; B61L 25/021
     USPC ................ 702/472, 31.4; 303/130; 700/304; 701/70; 246/1 R; 74/5.4
See application file for complete search history.

(56) References Cited

U.S. PATENT DOCUMENTS

| | | | | |
|---|---|---|---|---|
| 2,417,209 A | * | 3/1947 | McCune | .................... B60T 8/74 |
| | | | | 303/130 |
| 5,608,631 A | * | 3/1997 | Tsutsumi | ............ B60T 8/17616 |
| | | | | 700/304 |
| 5,809,448 A | * | 9/1998 | Gimenez | ................... B61F 5/22 |
| | | | | 246/1 R |
| 2005/0137761 A1 | | 6/2005 | Lungu | |
| 2008/0022790 A1 | * | 1/2008 | Lee | ......................... G01C 19/42 |
| | | | | 74/5.4 |

(Continued)

FOREIGN PATENT DOCUMENTS

| EP | 1705095 A1 | 9/2006 |
|---|---|---|
| WO | 2009074724 A1 | 6/2009 |
| WO | 2012010809 A1 | 1/2012 |

OTHER PUBLICATIONS

Looney "A simple calibration for MEMS gyroscopes" 1-4 pages, Jul. 2010.*

(Continued)

*Primary Examiner* — Regis J Betsch
*Assistant Examiner* — Kaleria Knox
(74) *Attorney, Agent, or Firm* — Soquel Group LLC

(57) ABSTRACT

A method for evaluating the angular velocity of a railway vehicle circulating on a track, the vehicle including an inertial unit including at least one angular velocity sensor, the method including measuring an instantaneous angular velocity provided by the sensor, determining the bias of the angular velocity measured around at least one axis, the velocity bias being taken as equal to the value of the angular velocity measured around this axis when the measured angular velocity is substantially constant for a predetermined period, and calculating the evaluated angular velocity, by subtracting from the measured angular velocity, the previously determined velocity bias.

11 Claims, 4 Drawing Sheets

(56) References Cited

U.S. PATENT DOCUMENTS

| | | | | |
|---|---|---|---|---|
| 2008/0140291 A1* | 6/2008 | Kobayashi | ............ | B60W 40/107 |
| | | | | 701/70 |
| 2008/0294342 A1* | 11/2008 | Hoshizaki | ............ | G01C 21/165 |
| | | | | 701/472 |
| 2009/0088918 A1* | 4/2009 | Takenaka | ............ | B60T 8/17551 |
| | | | | 701/31.4 |
| 2013/0305956 A1* | 11/2013 | Jackson | ................ | B61C 13/00 |
| | | | | 105/72.2 |

OTHER PUBLICATIONS

Search Report for Patent Application No. FR 12 62838, dated Dec. 10, 2013.

* cited by examiner

METHOD FOR EVALUATING THE VELOCITY OF A RAILWAY VEHICLE

CROSS-REFERENCES TO RELATED APPLICATIONS

This application claims priority to French Patent Application No. 12 62838, filed by inventor Jean Le Bastard on Dec. 27, 2012.

FIELD OF THE INVENTION

This invention relates to methods for using sensors to measure motion parameters of railway vehicles.

BACKGROUND OF THE INVENTION

In order to determine their velocity and the distance covered on the track, railway vehicles are equipped with wheel sensors, allowing measurement of the rotation of one or several wheels of the vehicle.

The measurements conducted from wheel sensors are often unusable and inaccurate, because of the sliding of the wheel relatively to the rail. This sliding either occurs during acceleration phases of the vehicle or during braking phases.

Conducting measurements of acceleration, velocity and position from an inertial unit was contemplated, but the information provided by the inertial units fitting out the vehicles is also marred with errors which result from inaccuracies or biases related to the technology used.

In practice, in order to reduce the manufacturing costs, these inertial units commonly apply MEMS technologies which delivered by design of values having a bias.

SUMMARY

The present invention relates to a method for evaluating the angular velocity of a railway vehicle circulating on a track of the type including an inertial unit including at least the one angular velocity sensor, the method including a step for measuring an instantaneous angular velocity provided by the sensor, including determining the bias of the angular velocity measured around at least one axis, the velocity bias being taken as equal to the value of the angular velocity measured around this axis when the measured angular velocity is substantially constant for a predetermined period, and a step for calculating the evaluated angular velocity, by subtracting from the measured angular velocity, the previously determined velocity bias.

An object of the invention is to provide a method and a facility which provides reliable information on the covered distance or on the velocity of a railway vehicle, from information notably stemming from an inertial unit.

For this purpose, an object of the invention is a method for evaluating the angular velocity of a railway vehicle circulating on a track of the aforementioned type, including determining the bias of the angular velocity measured around at least one axis, the velocity bias being taken to be equal to the value of the angular velocity measured around at least one axis, the velocity bias being taken equal to the value of the angular velocity measured around this axis when the measured angular velocity is substantially constant for a predetermined period, and a step for calculating the evaluated angular velocity by subtracting from the measured angular velocity, the previously determined velocity bias.

According to particular embodiments, the method includes one or several of the following features:

the angular velocity is measured around an axis parallel to the plane of forward movement of the railway vehicle and perpendicular to the forward movement direction of the railway vehicle, the bias of the measured angular velocity is determined when the slope of the track on which circulates the railway vehicle, is constant and the evaluated angular velocity is calculated from the previously determined bias when the slope of the track on which circulates the railway vehicle, is variable;

the angular velocity is measured around an axis perpendicular to the plane of forward movement of the railway vehicle, the bias of the measured angular velocity is determined when the track on which circulates the railway vehicle, is a rectilinear or with constant curvature, and the evaluated angular velocity is calculated from the previously determined bias when the track on which circulates the railway vehicle, is of variable curvature;

the angular velocity is measured around an axis parallel to the direction of forward movement of the railway vehicle, the bias of the measured angular velocity is determined when the track on which circulates the railway vehicle is with constant banking, and the evaluated angular velocity is calculated from the previously determined bias when the track on which are circulates the railway vehicle, is of variable banking;

The method further includes a phase for evaluating the acceleration including measuring the instantaneous acceleration of the railway vehicle along the forward movement direction of the vehicle with an acceleration sensor fitting out the railway vehicle, and in that it includes determining the bias of the measured acceleration, the acceleration bias being taken equal to the value of the measured instantaneous acceleration when the railway vehicle is at a standstill, and calculating the evaluated acceleration by subtracting from the measured instantaneous acceleration the previously determined acceleration bias;

The method further includes a phase for evaluating the acceleration including measuring the instantaneous acceleration of the railway vehicle along with the forward movement direction of the vehicle with an acceleration sensor with which the railway vehicle is equipped, it includes measuring the acceleration of the railway vehicle with a wheel sensor able to determine the velocity of rotation of the wheel, and it includes determining the bias of the measured acceleration, the acceleration bias being taken equal to the average acceleration difference measured by the wheel sensor and the acceleration sensor over a predetermined period of time during which the wheel does not slip relatively to the rail, and calculating the evaluated acceleration, by subtracting from the measured instantaneous acceleration, the previously determined acceleration bias, the determining the acceleration bias only being carried out if the period of time during which the wheel does not slip relatively to the rail, has a duration of more than 1 second.

An object of the invention is further a method for evaluating the acceleration, the velocity or the position of a railway vehicle, including the evaluation of the angular velocity of the railway vehicle around three directions perpendicular to each other, by applying a method as defined above, the evaluation of the acceleration of the vehicle along its forward movement direction by applying a method as defined above, and it includes estimating the acceleration, the velocity or the position of the railway vehicle, by correcting the evaluated acceleration from evaluated angular velocities and optional integration.

The invention finally relates to a facility for evaluating the angular velocity of a railway vehicle circulating on a track, the vehicle includes at least one angular velocity sensor, able to measure an instantaneous angular velocity, including means for determining the bias of the angular velocity measured around at least one axis, the velocity bias being taken as equal to the value of the angular velocity measured around this axis when the measured angular velocity is substantially constant for a predetermined period, and means for calculating the evaluated angular velocity, determined by subtracting from the measured angular velocity, the previously determined velocity bias.

An object of the invention is also a railway vehicle including a facility as defined above.

BRIEF DESCRIPTION OF THE DRAWINGS

The invention will be better understood upon reading the description which follows only given as an example and made with reference to the drawings wherein.

DETAILED DESCRIPTION

Figure 1:
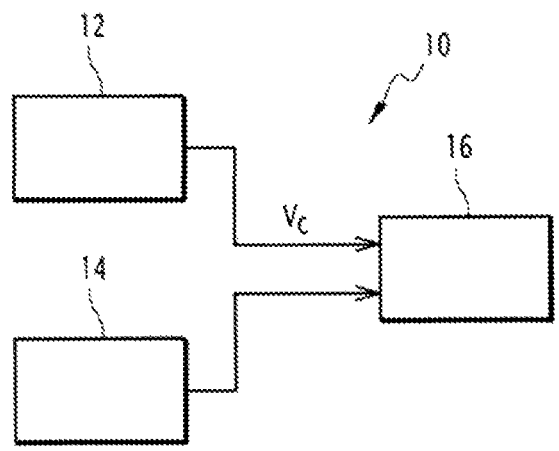
FIG. 1 is a schematic view of the facility for evaluating velocity, applied in a vehicle according to the invention.

The facility illustrated in FIG. 1 equips a railway vehicle, notably for example a locomotive of a convoy of passenger cars or wagons of goods. It is able to calculate the velocity and the distance covered by the vehicle.

The vehicle on which the facility 10 is installed is equipped on at least one wheel with a wheel centre 12 consisting of a wheel provided with notches which is secured to the wheel and with an optical sensor which is attached to the structure of the vehicle. The optical sensor is able to detect the passing of the notches during the rotation of the wheel. Such is a sensor is known per se and will not be described further.

The wheel sensor provides the velocity of rotation of the wheel from which a measured instantaneous velocity noted as $V_c$ is measured by multiplying this velocity of rotation by the radius of the wheel. It further provides an acceleration of the wheel.

Further, the vehicle includes an inertial unit 14 formed with at least one accelerometer and three gyroscopes. Preferably this inertial unit is based on MEMS technology.

Advantageously, the inertial unit includes three accelerometers, each able to determine the acceleration along three axes perpendicular to each other. Thus, a first accelerometer is able to determine the acceleration along the X axis of the vehicle, consisting of the forward movement direction of the vehicle along the track. Another sensor is positioned along a generally horizontal axis Y transverse to the vehicle and a third one along a generally vertical axis Z also transverse to the vehicle.

Further, the three gyroscopes are able to determine measured angular velocities $\dot{\theta}_x$, $\dot{\theta}_y$, $\dot{\theta}_z$ of the vehicle respectively around the axes X, Y and Z as defined earlier.

The wheel sensor 12 and the inertial unit 14 are both connected to a central information processing unit 16 for odometric calculation of the velocity and of the distance covered by the vehicle from information received from the inertial unit, corrected with information received from the wheel sensor.

The information of distance covered by the vehicle, as well as the information of velocity, are only calculated from measured information stemming from the inertial unit, the measured information stemming from the wheel sensor being only used for correcting possible biases in the measurements stemming from the inertial unit.

As known per se, the central unit 16 ensures the calculation of the velocity of the vehicle and of the covered distance by respectively simple and double integration relatively to time of the acceleration measured along the axis X, while taking into account the tilt of the vehicle, around the axes X, Y and Z and other pieces of information provided by the inertial unit.

The methods for calculating the velocity and the covered distance of the vehicle by integrating accelerations and velocities of the vehicle are detailed hereinbelow.

By using the following terminology:

$D_T$=distance covered by the railway vehicle
$S_T$=longitudinal velocity of the railway vehicle
$A_T$=longitudinal acceleration of the railway vehicle These quantities are expressed in the following way:

$$S_T(t) = \int_o^t A_T(t)^* dt + S_T(0)$$

$$D_T(t) = \int_o^t S_T(t)^* dt + D_T(0)$$

If the inertial acceleration measured by the acceleration sensor placed along the X axis is $\ddot{x}(t)$, the grade is the tilt or gradient of the track, and g is the attraction of the Earth, as long as the grade is low, one has:

$$A_T(t) = \ddot{x}(t)^* - g^* \sin(\text{grade}).$$

If the velocity of rotation around the axis Y measured by the inertial unit is $\dot{\theta}_y(t)$, cant is the <<extra height>> of the track, $\dot{\theta}_z(t)$ and $\dot{\theta}_x(t)$ are respectively the velocities of rotation measured around the axes Z and X, then one has $$\text{grade} = \int [\dot{\theta}_y(t) - \dot{\theta}_z(t)^* \sin(\text{cant}t)]^* dt$$

wherein $\text{cant} t = \int \dot{\theta}_x(t)^* dt$ and thus $$A_t(t) = \ddot{x}_m(t) - g^* \sin(\int [\dot{\theta}_y(t) - \dot{\theta}_z(t)^* \sin(\int \dot{\theta}_x(t)^* dt)]^* dt)$$

Accordingly, the values of the acceleration, the velocity and the position of the railway vehicle may be evaluated from the single values $\ddot{x}m(t)$
$\dot{\theta}_y(t)$
$\dot{\theta}_z(t)$
$\dot{\theta}_x(t)$ and from known initial conditions, notably relating to the velocity $S_T(0)$.

The other pieces of information, notably afforded on the tilt of the railway vehicle are provided by the angular velocity sensors. This angular velocity information is integrated relatively to time by the odometric processing unit 16 in order to determine the position of the vehicle.

In practice, each value measured by the inertial unit 14 is marred with a bias.

Figure 2:
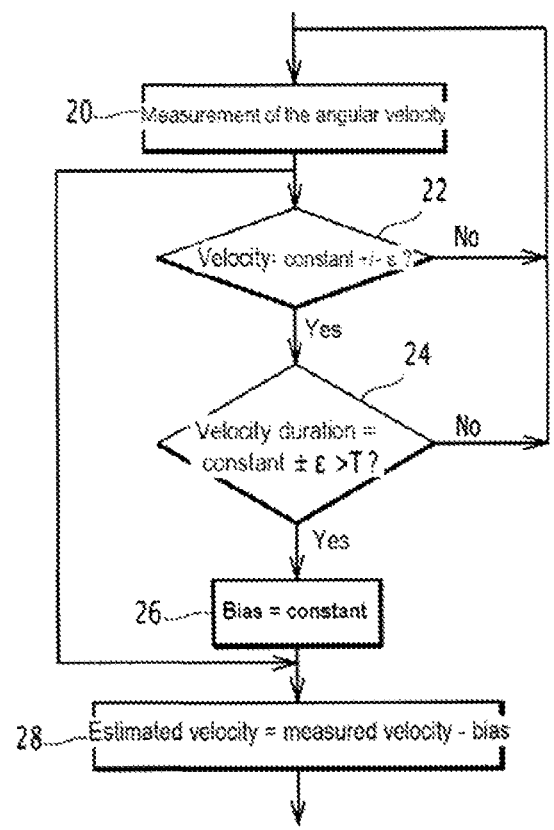
FIG. 2 is a flow chart of the algorithm applied for correcting one of the measured velocities.
Figure 5:
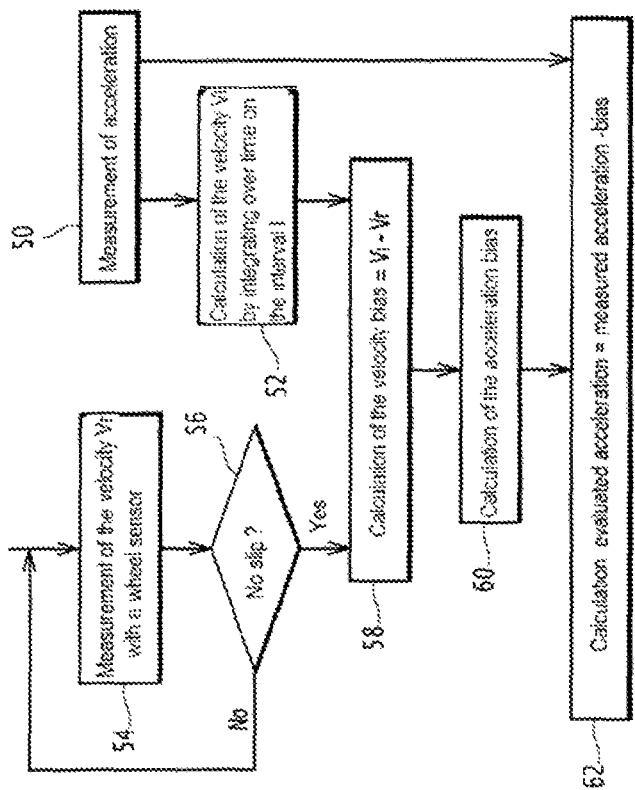
FIG. 5 is a flow chart of the algorithm applied for correcting the measured acceleration.

According to the invention, the method applied by the processing unit 16 ensures correction of each of the biases of the measurements conducted by the angular velocity sensors of the inertial unit by applying an algorithm as illustrated in FIG. 2, and of the measured acceleration $\ddot{x}_m(t)$ according to the algorithm of FIG. 5 for providing estimated angular velocity acceleration values which are equal to the corresponding measured value from which the bias calculated earlier, was subtracted.

Thus, for a particular angular velocity measurement around an axis, the algorithm of FIG. 2 is applied in a loop.

In step 20 the angular velocity is measured.

In step 22, a test is conducted in order to determine whether the measured angular velocity is substantially equal to the velocity measured earlier, i.e. with a difference of less than a very small value $\varepsilon$. If such is the case, a second test is conducted in step 24 for determining whether the angular velocity is substantially constant over a time interval with a duration greater than a predetermined duration T.

If such is the case, the bias is taken in step 26 to be equal to the constant value of the velocity ascertained over the predetermined interval T. Preferably, the interval T has a duration comprised between 5 and 30 seconds.

In step 28, the estimated angular velocity is calculated as being equal to the measured angular velocity corrected with the last bias calculated in step 26.

Thus, for each angular velocity measured in step 20, an estimated velocity is determined in step 28, from the last bias calculated at the end of a predetermined period T during which the angular velocity remained constant.

If the tests of steps 22 and 24 are negative, step 20 is again applied in order to give the possibility of permanently providing an estimated angular velocity.

The thereby calculated estimated angular velocity provides highly satisfactory information on the actual angular velocity.

Figure 3:
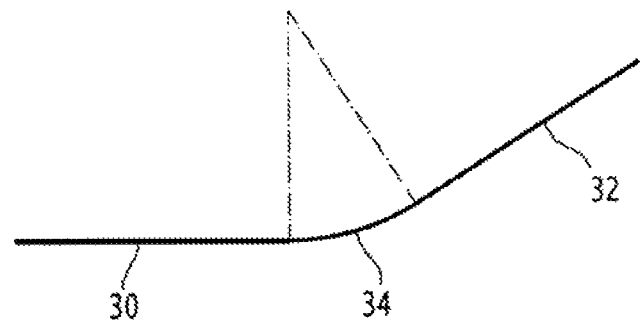
FIG. 3 is a schematic elevational side view of a track for circulation of a railway vehicle.

Indeed, if the angular velocity around the axis Y is considered, it is understood that as long as the vehicle circulates on a horizontal track or on a track segment with constant slope, such as the segments 30 and 32 illustrated in FIG. 3, the angular velocity around the axis Y is zero. If the estimated velocity on the segments is non-zero, the then measured velocity corresponds to the bias which has to be corrected.

During a connection segment 34, commonly formed by a circular segment, the estimated velocity is taken to be equal to the measured velocity corrected by the bias determined during the previous horizontal section of constant slope and an angular velocity assumed to be correct is then obtained in this way. No correction of the bias is made during the crossing of the curve segment 34.

Figure 4:
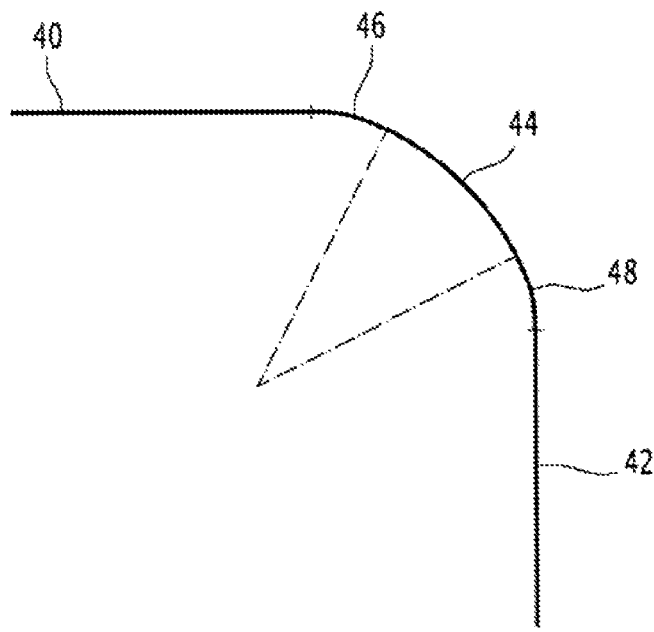
FIG. 4 is a top view of a track for circulation of a railway vehicle.

Also, and as illustrated in FIG. 4, when a railway vehicle circulates on a rectilinear section as seen from above, like the sections 40 and 42, the track not having any banking, and being rectilinear, the angular velocities around the axes Y and Z should be zero. If such is not the case, a correction of the bias is made according to the algorithm of FIG. 2, by subtracting from the measured velocity the constant value of the then measured velocity.

Also, during circulation on a section as seen from above consisting of a circular section 44, the banking applied to the track and therefore to the vehicle is constant by design of the track so that the angular velocity around the axis X is normally zero. If such is not the case, a correction is made according to the algorithm of FIG. 2.

Upon crossing a section with a non-constant radius of curvature as seen from above, such as a clothoid section 46, 48, commonly used for connecting a circle-shaped section to a rectilinear section, no calculation of bias is carried out for the velocity of rotation around the axes X, Y and Z and the correction is carried out from the angular velocities with the last calculated bias.

The bias on the acceleration is calculated and taken into account in order to measure and calculate an acceleration, estimated according to one of the following methods.

The first method consists of determining when the railway vehicle is at a standstill and of then measuring the acceleration provided by the sensor. The bias is then taken to be equal to the measured acceleration since, at a standstill, the acceleration should be zero.

For the foregoing, while the vehicle is in motion, the measured acceleration is taken equal to the measured acceleration reduced by the last thereby calculated bias. In this embodiment, the wheel sensor is unnecessary.

According to another embodiment, the bias on the measured acceleration is determined by applying the algorithm of FIG. 5.

In step 50, the acceleration is measured continuously. In step 52, the velocity is calculated from the integration over time of the acceleration values measured in step 50.

In parallel, in step 54, measurement of the velocity of the wheels of the vehicle, from the wheel sensor is carried out. A test is conducted in step 56 in order to determine whether the wheel slips relatively to the rail or if adherence is satisfactory. Simultaneously a time interval I is determined with no slipping during which the wheel does not slip.

The determination of a possible slip is carried out by any known suitable methods.

In the absence of a slip detected over an interval I with a period of more than one second, a calculation of the bias on the velocity is carried out in step 58 by difference between the calculated velocity in step 52 and the one measured in step 54.

In step 60, the bias on the acceleration is calculated by difference between the acceleration of the wheel and the measured acceleration, averaged over the interval I or an interval less than I but greater than one second.

Finally, a calculation of the estimated acceleration is carried out in step 62 for each acceleration measured in step 50 by the difference between the measured acceleration and the last bias calculated in step 60.

In the absence of a long interval of more than 1 second without any slipping, no new bias on the acceleration is calculated.

Figure 6:
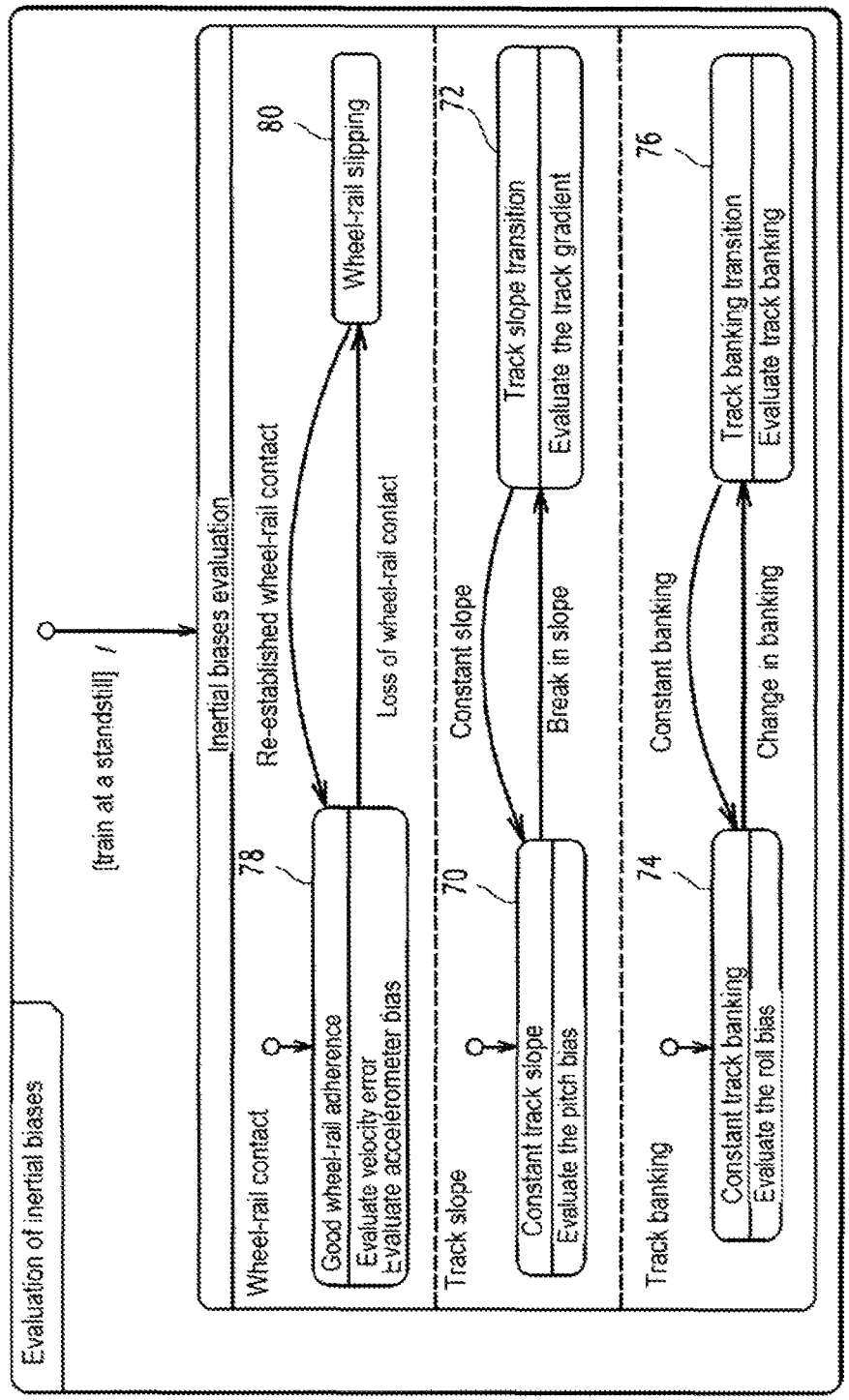
FIG. 6 is an illustration of the states of the facility according to the invention.

The situation may thus be summarized on the state diagram illustrated in FIG. 6.

In this diagram, it is seen that concerning the slope of the track, i.e. the taking into account of the angular velocity around the axis Y, an evaluation of the bias of the angular velocity around the axis Y (pitching bias) is carried out in state 60 when the slope of the track is constant. During track slope transitions, illustrated by the state 72, an evaluation of the gradient of the track, i.e. of the angular velocity around the axis Y is carried out. The transitions between both of these states occur depending on whether the slope is constant or whether there is a break in slope. Both of these transient states are detected by the fact that the angular velocity around the axis Y is less than a threshold close to 0.

Also, in order to take into account the deformation of the track in the horizontal plane, or of the banking imposed to the track, the evaluation of the bias of the angular velocity around the axis X is carried out in state 74, when the track banking is constant.

On the other hand, in state 76, during a track banking transition, the bias of the angular velocity around the axis X is no longer estimated but the track banking is then evaluated.

The transitions between the states 74 and 76 are carried out according to whether the banking becomes constant or variable, i.e. the angular velocity around the axis X is zero or different from zero.

As regards the bias on the acceleration, in state 78, when good adherence is detected between the rail and the wheel, the acceleration bias is evaluated according to the algorithm of FIG. 5 as well as the velocity bias.

On the other hand, in the case of a rail/wheel slipping state 80, the velocity bias and the acceleration bias are not estimated and only the acceleration is evaluated from biases calculated earlier and from measurements made.

The transitions between both states are carried out upon appearance or disappearance of a slip between the wheel and the rail.

The invention claimed is:

1. A method for obtaining an accurate instantaneous angular velocity of a railway vehicle circulating on a track, the track including constant-slope and variable-slope portions, constant-curvature and variable-curvature portions, and constant-banking and variable-banking portions, the vehicle including an inertial unit including at least one angular velocity sensor that measures with bias an instantaneous angular velocity ($\dot{\theta}_x(t)$, $\dot{\theta}_y(t)$, $\dot{\theta}_z(t)$) at any given time, t, the method comprising:
   determining a velocity bias of the angular velocity measured around at least one axis, comprising:
      measuring the instantaneous angular velocity around this axis at a plurality of times $t_1, t_2, \ldots, t_n$, when the vehicle circulates on one of the constant-slope portions, on one of the constant-curvature portions, or on one of the constant-banking portions;
      checking that said measured instantaneous angular velocities have a substantially constant value for a predetermined period of time; and
      taking the velocity bias as equal to the constant value; and
   obtaining an accurate instantaneous angular velocity at time t, by subtraction, from the measured instantaneous angular velocity at time t, of the previously determined velocity bias.

2. The method according to claim 1, wherein the angular velocity ($\dot{\theta}_y(t)$) is measured around an axis (Y) parallel to the forward movement plane of the railway vehicle and perpendicular to the forward movement direction of the railway vehicle, wherein the bias of the measured angular velocity is computed when the slope of the track along which the railway vehicle circulates is constant, and wherein the evaluated angular velocity is based on the previously computed bias when the slope of the track along which the railway vehicle circulates is variable.

3. The method according to claim 1, wherein the angular velocity ($\dot{\theta}_z(t)$) is measured around an axis (Z) perpendicular to the forward movement plane of the railway vehicle, wherein the bias of the measured angular velocity is computed when the track along which the railway vehicle circulates is rectilinear or of constant curvature, and wherein the evaluated angular velocity is based on the previously computed bias when the track along which the railway vehicle circulates is of variable curvature.

4. The method according to claim 1, wherein the angular velocity ($\dot{\theta}_x(t)$) is measured around an axis (X) parallel to the forward movement direction of the railway vehicle, wherein the bias of the measured angular velocity is computed when the track along which the railway vehicle circulates is of constant banking, and wherein the evaluated angular velocity is based on the previously computed bias when the track along which the railway vehicle circulates is of variable banking.

5. The method according to claim 1, wherein the instructions further cause the processor to perform a process for obtaining an accurate instantaneous acceleration of the railway vehicle from a biased acceleration sensor, comprising:
   measuring the instantaneous acceleration ($\ddot{x}_m(t)$) at a plurality of times $t_1, t_2, \ldots, t_n$, of the railway vehicle along the forward movement direction of the vehicle with an acceleration sensor with which the railway vehicle is equipped;
   computing a bias of the measured acceleration, the acceleration bias being taken equal to the value of the instantaneous acceleration measured when the railway vehicle is at a standstill; and
   obtaining an accurate instantaneous acceleration at time t, by subtraction, from the measured instantaneous acceleration at time t, of the previously determined acceleration bias.

6. The method according to claim 1, wherein the instructions further cause the processor to perform a process for obtaining an accurate instantaneous acceleration of the railway vehicle from a biased acceleration sensor, comprising:
   measuring the instantaneous acceleration ($\ddot{x}_m(t)$) at a plurality of times $t_1, t_2, \ldots, t_n$, of the railway vehicle along the forward movement direction of the vehicle with an acceleration sensor with which the railway vehicle is equipped;
   measuring the acceleration of the railway vehicle with a wheel sensor adapted for determining the rotation speed of the wheel;
   determining the bias of the measured acceleration, the acceleration bias being taken as equal to the average acceleration difference measured with the wheel sensor and the acceleration sensor over a predetermined time period during which the wheel does not slip relatively to the rail; and
   obtaining an accurate instantaneous acceleration at time t, by subtraction, from the measured instantaneous acceleration at time t, of the previously determined acceleration bias.

7. The method according to claim 6, wherein said determining the bias of the measured acceleration is only carried out if the period of time, during which the wheel does not slip relatively to the rail, has a duration of more than 1 second.

8. The method according to claim 5, wherein the instructions further cause the processor to perform a process for evaluating the acceleration, the velocity or the position of the railway vehicle, comprising:
   obtaining the angular velocity of the railway vehicle around three directions perpendicular to each other, by performing the process for evaluating the angular velocity;
   obtaining the acceleration of the vehicle along its forward motion direction by performing the process for evaluating the acceleration of the railway vehicle; and
   estimating the acceleration, the velocity or the position of the railway vehicle, by correcting the evaluated acceleration from evaluated angular velocities.

9. A facility for obtaining an accurate instantaneous angular velocity of a railway vehicle circulating on a track, the vehicle including at least one angular velocity sensor, adapted for measuring with bias an instantaneous angular velocity at any given time t, comprising:

means for determining the bias of the angular velocity measured around at least one axis, the velocity bias being taken equal to the value of the instantaneous angular velocity measured around this axis when said measured instantaneous angular velocity is substantially constant for a predetermined period; and means for obtaining an accurate instantaneous angular velocity at time t, determined by subtraction, from the measured instantaneous angular velocity at time t, of the previously determined velocity bias, wherein the facility is configured for carrying out a method according to claim 1.

10. A railway vehicle including a facility according to claim 9.

11. The method according to claim 1, further comprising, in a loop:

measuring the angular velocity around at least one axis;

ascertaining that the measured angular velocity is substantially constant over the predetermined period; and if the measured angular velocity is substantially constant over the predetermined period, taking the velocity bias equal to the constant value of the angular velocity ascertained over the predetermined period.

\* \* \* \* \*